United States Patent
Koskimies

(10) Patent No.: US 8,381,172 B2
(45) Date of Patent: Feb. 19, 2013

(54) METHOD, APPARATUS, MOBILE TERMINAL AND COMPUTER PROGRAM PRODUCT FOR EMPLOYING A FORM ENGINE AS A SCRIPT ENGINE

(75) Inventor: Oskari Koskimies, Helsinki (FI)

(73) Assignee: Nokia Corporation, Espoo (FI)

( * ) Notice: Subject to any disclaimer, the term of this patent is extended or adjusted under 35 U.S.C. 154(b) by 1080 days.

(21) Appl. No.: 12/326,556

(22) Filed: Dec. 2, 2008

(65) Prior Publication Data
US 2010/0138733 A1    Jun. 3, 2010

(51) Int. Cl.
G06F 9/44 (2006.01)
(52) U.S. Cl. .......................... 717/104; 717/106; 717/114
(58) Field of Classification Search .................. None
See application file for complete search history.

(56) References Cited

U.S. PATENT DOCUMENTS

| | | | | |
|---|---|---|---|---|
| 7,246,326 B2* | 7/2007 | Haley | | 715/762 |
| 7,269,822 B2* | 9/2007 | Gebhart et al. | | 717/114 |
| 7,546,602 B2* | 6/2009 | Hejlsberg et al. | | 717/114 |
| 7,577,938 B2* | 8/2009 | Bent et al. | | 717/104 |
| 7,730,425 B2* | 6/2010 | de los Reyes et al. | | 715/835 |
| 7,844,739 B2* | 11/2010 | Ganesan et al. | | 709/246 |
| 7,886,284 B2* | 2/2011 | Haven et al. | | 717/114 |
| 7,890,923 B2* | 2/2011 | Elaasar | | 717/104 |
| 7,917,856 B2* | 3/2011 | Sahoo | | 717/106 |
| 7,978,618 B2* | 7/2011 | Richardson et al. | | 370/252 |
| 8,028,269 B2* | 9/2011 | Bhatia et al. | | 717/106 |
| 8,060,857 B2* | 11/2011 | Biggerstaff | | 717/106 |
| 2002/0100015 A1* | 7/2002 | Harel et al. | | 717/104 |
| 2003/0090513 A1* | 5/2003 | Ramakrishnan | | 345/744 |
| 2004/0003341 A1 | 1/2004 | alSafadi et al. | | |
| 2004/0021679 A1* | 2/2004 | Chapman et al. | | 345/700 |
| 2004/0148586 A1* | 7/2004 | Gilboa | | 717/104 |
| 2005/0172261 A1* | 8/2005 | Yuknewicz et al. | | 717/106 |
| 2005/0188350 A1* | 8/2005 | Bent et al. | | 717/106 |
| 2005/0198617 A1* | 9/2005 | Kim et al. | | 717/114 |
| 2006/0117303 A1* | 6/2006 | Gizinski | | 717/114 |
| 2007/0033595 A1 | 2/2007 | Carr et al. | | |
| 2007/0094609 A1* | 4/2007 | Gilboa et al. | | 717/104 |
| 2007/0288657 A1 | 12/2007 | Koskimies | | |

OTHER PUBLICATIONS

Lee, Seo, "Contents Adaptation of XForms Pages using XPath Filtering", Jul. 2008, International Conference on Advanced Language Processing and Web Information Technology; [retrieved on Apr. 16, 2012]; Retrieved from Internet <URL:http://ieeexplore.ieee.org/stamp/stamp.jsp?tp=&arnumber=4584430>;pp. 575-580.*

He, Yen, "Adaptive User Interface Generation for Wev Services", 2007, IEEE International Conference on e-Business Engineering; [retrieved on Apr. 16, 2012]; Retrieved from Internet <URL:http://ieeexplore.ieee.org/stamp/stamp.jsp?tp=&arnumber=4402145>;pp. 536-539.*

(Continued)

Primary Examiner — Thuy Dao
Assistant Examiner — Xi D Chen
(74) Attorney, Agent, or Firm — Alston & Bird LLP

(57) ABSTRACT

An apparatus for employing a form engine as a script engine may include a processor. The processor may be configured to determine whether an event relates to starting a form or running a script, employ a form engine having a user interface portion including user interface components in response to a determination that the event relates to starting the form, and adapt the form engine by providing a reduced user interface portion that does not create user interface components and does not generate user interface events in response to a determination that the event relates to running the script. A corresponding method and computer program product are also provided.

21 Claims, 3 Drawing Sheets

OTHER PUBLICATIONS

Thiemann, et al., "An Embedded Domain-Specific Language for Type-Safe Server-Side Web Scripting", 2005 ACM; [retrieved on Oct. 9, 2012]; Retrieved from Internet <URL:http://dl.acm.org/citation.cfm?id=1052934>;pp. 1-46.*

Bergman, et al., "VIEW—An Exploratory Molecular Visualization System with User-Defineable Interaction Sequences", 1993 ACM; [retrieved on Oct. 9, 2012]; Retrieved from Internet <URL:http://dl.acm.org/citation.cfm?id=166117>;pp. 117-126.*

Gardner, et al., "Declarative Web Form Design Method for XForms in e-Business Applications", 2005 IEEE; [retrieved on Oct. 9, 2012]; Retrieved from Internet <URL:http://ieeexplore.ieee.org/stamp/stamp.jsp?tp=&arnumber=1560377>;pp. 204-208.*

Ostrowski, Birman, "WS-Objects: Extending Service-Oriented Architecture with Hierarchical Composition of Client-Side Asynchronous Event-Processing Logic", 2009 IEEE; [retrieved on Oct. 9, 2012]; Retrieved from Internet <URL:http://ieeexplore.ieee.org/stamp/stamp.jsp?tp=&arnumber=5175803>;pp. 25-34.*

International Search Report for International Application No. PCT/FI2009/050816 mailed Jan. 18, 2010.

Mikko Honkala and Petri Vuorimaa; A Configurable XForms Implementation; Proceedings of the IEEE Sixth International Symposium on Multimedia Software Engineering (ISMSE'04); 0-7695-2217-3/04; 8 sheets.

* cited by examiner

METHOD, APPARATUS, MOBILE TERMINAL AND COMPUTER PROGRAM PRODUCT FOR EMPLOYING A FORM ENGINE AS A SCRIPT ENGINE

TECHNOLOGICAL FIELD

Embodiments of the present invention relate generally to form markup languages and, more particularly, relate to a method, apparatus, and computer program product for enabling the use of a form engine employing a form markup language as a script engine.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In certain applications, it is necessary for the user to enter data into forms. A particular form markup language, known as XForms, is an example of a next generation form markup, which replaces traditional forms in, for example, XHTML 2.0. XForms can also be used with other markups such as synchronized media integration language (SMIL). XForms provide certain advantages such as device independency, separation of data from presentation, and compatibility with extensible markup language (XML) infrastructure. As such, XForms may be useful for implementation in a form engine.

In certain environments, such as an enterprise-oriented mobile service platform, it may be desirable for business logic in the mobile client to be transparently upgradeable (e.g., without user involvement). In other words, it may be desirable for upgrades to be done via reconfiguration instead of via a software upgrade since software upgrades may be costly, inconvenient for end users and/or prone to failure. In some cases, business-oriented mobile services may be form-centric (e.g., rather than media-centric), and thus a form engine may be desirable for use in reconfiguration. In this regard, for example, when a business document is received by the mobile client, the form engine may be used to run a form using the document as an input parameter. However, in addition to a form engine, a script engine may also be useful for certain types of processing that may be encountered. For example, a form engine may handle interactive business logic (e.g., for a product order document, the form engine may be used to present the user with a form that allows the user to change product pricing), but may not be useful for other functions such as automatic processes (e.g., automatically checking to determine whether product prices are within a certain range and taking action if the prices are not within the range). In such cases, a script engine may be useful.

Accordingly, some form engines may include a separate script engine to handle form logic implemented with script. A web browser may be an example of such a form engine. In this regard, a (HyperText Markup Language) HTML form may use a JavaScript to implement form logic. However, a full web browser with JavaScript support may be a relatively heavy component that may be difficult to implement in mobile Java (J2ME). Thus, the code footprint for such an implementation may be relatively large.

Accordingly, it may be desirable to provide an improved mechanism for employing a form engine along with a script engine.

BRIEF SUMMARY

A method, apparatus and computer program product are therefore provided to enable the use of a form engine employing a form markup language (e.g., XForms) as a script engine. In particular, a method, apparatus and computer program product are provided that enables adaptation of a form engine for utilization in script processing as a script engine. As such, embodiments of the present invention may provide, for example, a form markup language including a model portion and a user interface portion may be modified so that the form markup language may lack a user interface portion, which effectively enables a form engine implemented from the form markup language to operate as a script engine. Accordingly, both form engine functionality and script engine functionality may be provided by a relatively lightweight implementation.

In one exemplary embodiment, a method of enabling the use of a form engine as a script engine is provided. The method may include determining whether an event relates to starting a form or running a script, employing a form engine having a user interface portion including user interface components in response to a determination that the event relates to starting the form, and adapting the form engine by providing a reduced user interface portion that does not create user interface components and does not generate user interface events in response to a determination that the event relates to running the script.

In another exemplary embodiment, a computer program product for enabling the use of a form engine as a script engine is provided. The computer program product may include at least one computer-readable storage medium having computer-executable program code instructions stored therein. The computer-executable program code instructions may include program code instructions for determining whether an event relates to starting a form or running a script, employing a form engine having a user interface portion including user interface components in response to a determination that the event relates to starting the form, and adapting the form markup language by providing a reduced user interface portion that does not create user interface components and does not generate user interface events in response to a determination that the event relates to running the script.

In another exemplary embodiment, an apparatus for enabling the use of a form engine as a script engine is provided. The apparatus may include a processor configured to determine whether an event relates to starting a form or running a script, employ a form engine having a user interface portion including user interface components in response to a determination that the event relates to starting the form, and adapt the form engine by providing a reduced user interface portion that does not create user interface components and does not generate user interface events in response to a determination that the event relates to running the script.

In another exemplary embodiment, an apparatus for enabling the use of a form engine as a script engine is provided. The apparatus includes means for determining whether an event relates to starting a form or running a script, means for employing a form engine having a user interface portion including user interface components in response to a determination that the event relates to starting the form, and means for adapting the form engine by providing a reduced user interface portion that does not create user interface components and does not generate user interface events in response to a determination that the event relates to running the script.

Embodiments of the invention may provide a method, apparatus and computer program product for advantageous employment in mobile terminals or other environments in which it is desirable to improve data processing capabilities without appreciably increasing memory and resource consumption of the mobile terminal.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
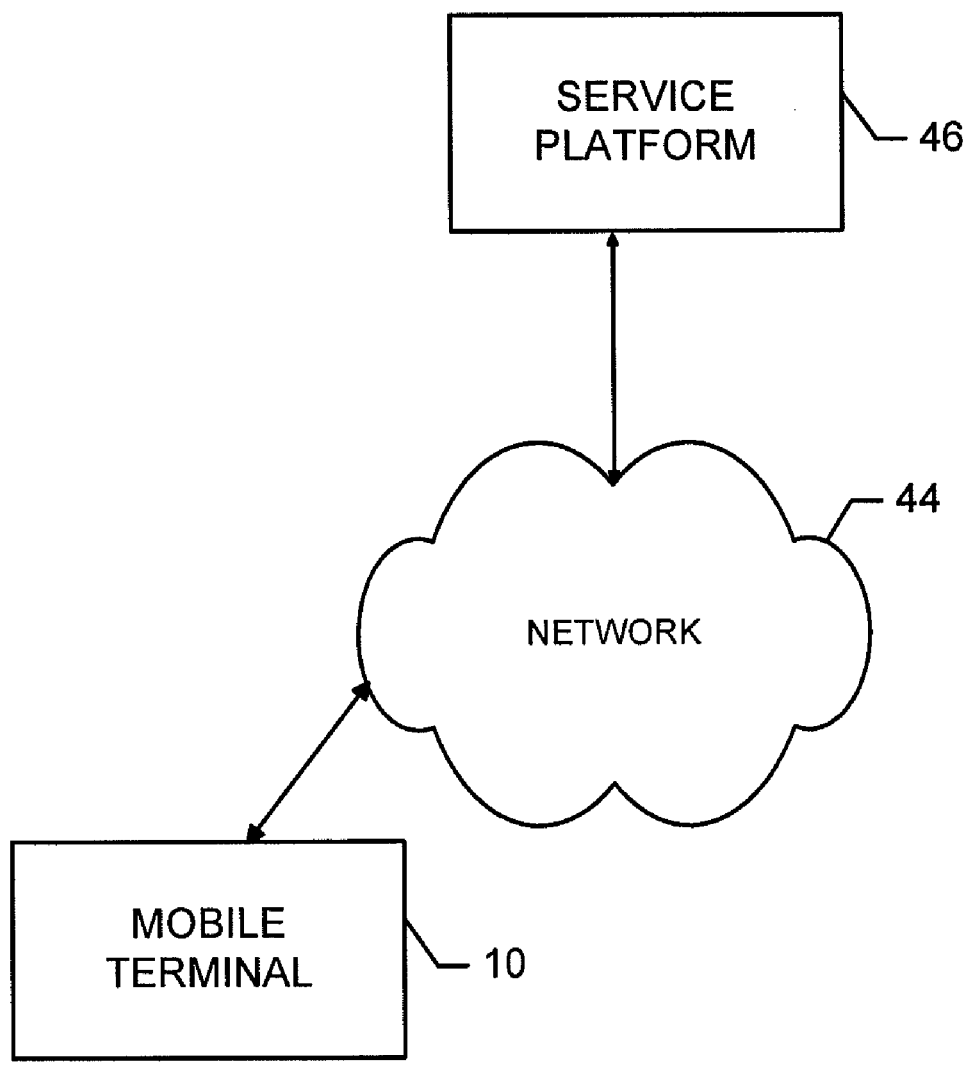
FIG. 1 is a schematic block diagram of a wireless communications system according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Embodiments of the present invention will be described below mainly in the context of XForms. However, XForms may be one example of a form markup language that may be employed in connection with practicing embodiments of the present invention. As such, other form markup languages may alternatively be employed in some cases. By way of background, XForms is an XML format for specification of user interfaces, and more specifically web forms. Web forms allow a user of a client device (e.g., the mobile terminal 10) to enter data that may be sent to a serving device (e.g., the service platform 46) for processing. Web forms often mimic the usage of paper forms. The web forms can be used to submit data to save on the serving device (e.g., information for ordering a product) or can be used to retrieve data (e.g., searching for information on a search engine).

FIG. 1 illustrates a generic system diagram in which a device such as a mobile terminal 10, which may benefit from embodiments of the present invention, is shown in an exemplary communication environment. As shown in FIG. 1, an embodiment of a system in accordance with an example embodiment of the present invention may include a first communication device (e.g., mobile terminal 10) capable of communication with other devices via a network 44. In some cases, embodiments of the present invention may further include one or more additional communication devices and one or more network devices such as a service platform 46 with which the mobile terminal 10 may communicate to provide, request and/or receive information. In some embodiments, the mobile terminal 10 may include an apparatus 50 that may be configured to employ embodiments of the present invention.

While several embodiments of the mobile terminal 10 may be illustrated and hereinafter described for purposes of example, other types of mobile terminals, such as portable digital assistants (PDAs), pagers, mobile televisions, mobile telephones, gaming devices, laptop computers, cameras, video recorders, audio/video player, radio, global positioning system (GPS) devices, or any combination of the aforementioned, and other types of voice and text communications systems, can readily employ embodiments of the present invention. Furthermore, devices that are not mobile may also readily employ embodiments of the present invention.

The network 44 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 44. Although not necessary, in some embodiments, the network 44 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 may be in communication with each other via the network 44 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the mobile terminal 10 via the network 44. By directly or indirectly connecting the mobile terminal 10 and other devices to the network 44, the mobile terminal 10 may be enabled to communicate with the other devices, for example, according to numerous communication protocols including Hypertext Transfer Protocol (HTTP) and/or the like, to thereby carry out various communication or other functions of the mobile terminal 10.

Furthermore, although not shown in FIG. 1, the mobile terminal 10 may communicate in accordance with, for example, radio frequency (RF), Bluetooth (BT), Infrared (IR)

or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 may be enabled to communicate with the network 44 and other devices by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the service platform 46 may be a device or node such as a server or other processing element. The service platform 46 may have any number of functions or associations with various services. As such, for example, the service platform 46 may be a platform such as a dedicated server (or server bank) associated with a particular information source or service, or the service platform 46 may be a backend server associated with one or more other functions or services. As such, the service platform 46 may represent a plurality of different services or information sources. The functionality of the service platform 46 may be provided by hardware and/or software components configured to operate in accordance with known techniques for the provision of information to users of communication devices. However, some of the functionality provided by the service platform 46 may be information provided in accordance with embodiments of the present invention.

In an exemplary embodiment, the service platform 46 may represent a source for information associated with a service that may be provided to the mobile terminal 10 in accordance with embodiments of the present invention. As such, for example, the mobile terminal 10 may run a client application configured to communicate with a corresponding server function at the service platform 46.

Figure 2:
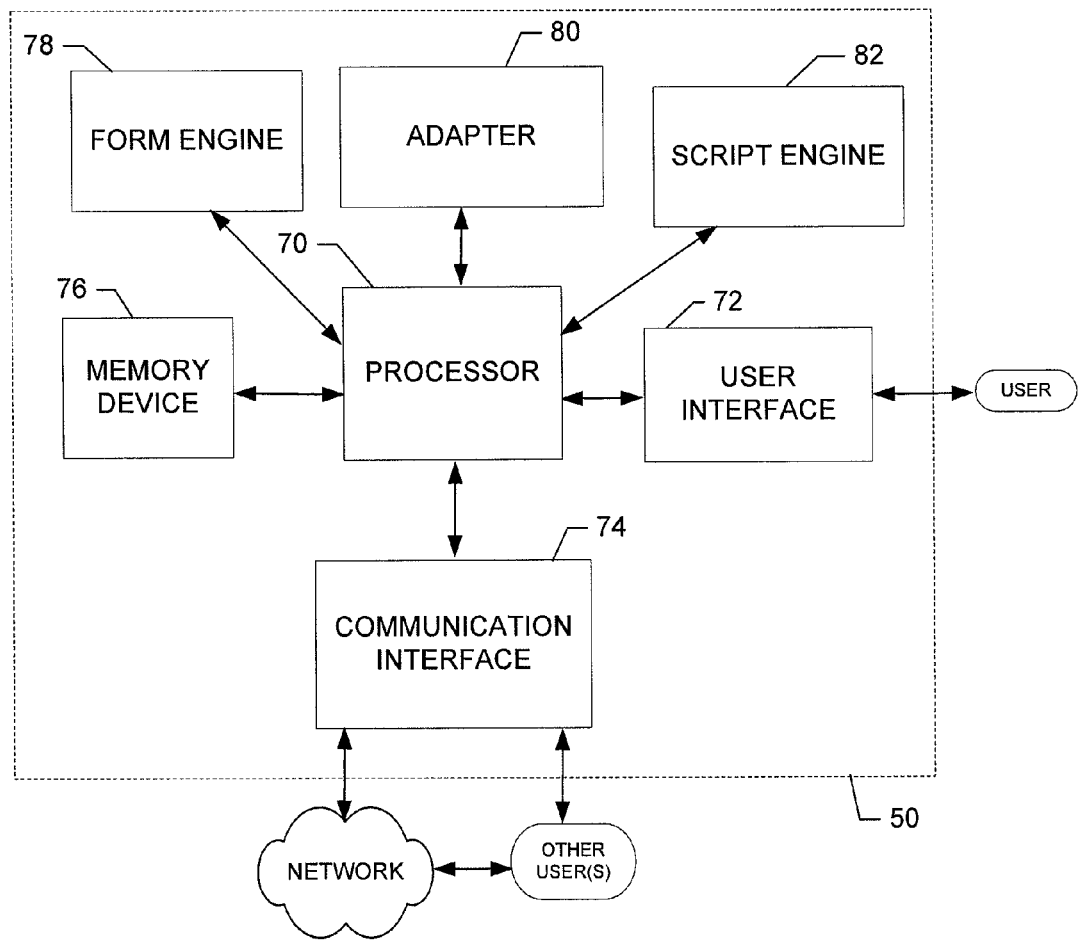
FIG. 2 illustrates a block diagram of portions of an apparatus for employing a form engine as a script engine according to an exemplary embodiment of the present invention.

FIG. 2 illustrates a schematic block diagram of an apparatus for enabling the adaptation of a form engine for use as a script engine according to an exemplary embodiment of the present invention. An exemplary embodiment of the invention will now be described with reference to FIG. 2, in which certain elements of an apparatus 50 for adaptation of a form engine for use as a script engine are displayed. As indicated above, the apparatus 50 of FIG. 2 may be employed, for example, on the service platform 46 or on the mobile terminal 10. However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the service platform 46 or the mobile terminal 10), by a plurality of devices in a distributed fashion (e.g., split between the service platform 46 and the mobile terminal 10) or by devices in a client/server relationship (e.g., the mobile terminal 10 and the service platform 46). Furthermore, it should be noted that the devices or elements described below may not be mandatory and thus some may be omitted in certain embodiments. Additional elements could also be added.

Referring now to FIG. 2, an apparatus 50 for enabling the use of a form engine as a script engine is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied at a communication device (e.g., the mobile terminal 10), the user interface 72 may include, among other devices or elements, any or all of a speaker, a microphone, a display, and a keyboard or the like.

In an exemplary embodiment, the processor 70 may be embodied as, include or otherwise control a form engine 78, an adapter 80 and a script engine 82. As such, the form engine 78, the adapter 80 and the script engine 82 may in some cases each be separate devices, modules, or functional elements. However, in other embodiments, the form engine 78, the adapter 80 and the script engine 82 may be embodied within a single device, module, or functional element, such as the processor 70, the apparatus 50 or the mobile terminal 10. The form engine 78, the adapter 80 and the script engine 82 may each be any means such as a device or circuitry embodied in hardware, software or a combination of hardware and software (e.g., processor 70 operating under software control) that is configured to perform the corresponding functions of the form engine 78, the adapter 80 and the script engine 82, respectively, as described below. In some embodiments, communication between the form engine 78, the adapter 80 and the script engine 82 may be conducted via the processor 70. However, the form engine 78, the adapter 80 and the script engine 82 may alternatively be in direct communication with each other or may have no communication with each other.

In an exemplary embodiment, the form engine 78, the adapter 80 and the script engine 82 may include instructions, code, modules, applications and/or circuitry for providing form processing, adaptation and script processing services, respectively. However, it should be noted that code, circuitry and/or instructions associated with the form engine 78, the adapter 80 and/or the script engine 82 need not necessarily be modular. Moreover, in at least one exemplary embodiment, the form engine 78 may be embodied using XForms, while the script engine 82 is embodied also using XForms as merely an adaptation of the form engine 78. The adapter 80 may be configured to adapt XForms of the form engine 78 to enable operation of the form engine 78 as the script engine 82 by virtue of the provision of special user interface bindings used when handling scripts.

The form engine 78 may be configured to process forms. In this regard, for example, the form engine 78 may process a form markup language such as XForms. As such, for example, the form engine 78 may be configured to provide a data processing model for data (e.g., XML data) and a user interface (or user interfaces) for the data. In this way, the form engine may be at least a partial implementation of the specification of the form markup language (e.g., XForms). The form engine 78 may therefore interpret form descriptions created by a form author and create a form's on-screen appearance. The form engine 78 may further handle form logic and user interaction with the form. Accordingly, since XForms, as an exemplary form markup language, may include a model portion and a user interface (UI) portion, the form engine 78 (which may also include corresponding model and UI portions) may be configured to reference data definitions and data bindings associated with the model portion and execute UI controls and UI interaction logic associated with the UI portion. When a form is started, the model portion typically receives an initialization or start-notification event (e.g., "XForms ready"). The form engine 78 may be configured to respond to such an event using various form markup language (e.g., XForms) actions or event handlers. Accordingly, the form engine 78 may be configured to get an input (e.g., a document) and modify the document based on user input. The form engine 78 may then be configured to send the modified document to some interface (e.g., a user interface). Thus, the form engine 78 typically assumes that a UI portion will be encountered.

The script engine 82 may be configured to process scripts. Thus, the script engine 82 may typically not include any UI portion. As such, for example, the script engine 82 may be configured to automate repetitive actions or enable state configurations. In this regard, the script engine 82 may run a script, for example, by inspecting one or more documents (e.g., XML documents) and possibly making changes to the documents. Changed documents may then either be sent to a predetermined receiver or saved in a local document database. In some cases where there is a single argument document (e.g., in a case where a script is run as an automatic response to the arrival of a document, that document may be given as an argument to the script), the argument may be given by using an XForms <instance> element with a predefined identifier (e.g., "document").

The adapter 80 may be configured to adapt the form engine 78 to operate as a script engine 82 under certain circumstances. In this regard, for example, the adapter 80 may be configured to effectively only enable operation with respect to the model portion of the form markup language (e.g., XForms) to basically eliminate the UI portion when appropriate. In an exemplary embodiment, effective removal of the UI portion may create a scripting language that may allow the use of all the power of the form markup language (e.g., XForms) without needing user interaction. A script may be written, for example, as an event handler for an "XForms ready" event, but some portions of the script may also execute as event handlers for "XForms-submit-done" or "XForms-submit-error" events.

In an exemplary embodiment, the adapter 80 may be configured to adapt the form engine 78 by providing a special "empty" or null user interface binding that does not create any user interface components and does not generate user interface events. Such a binding may typically be implemented with code of relatively small or even negligible size. Accordingly, the adaptation of the form engine 78 to operation as the script engine 82 may be accomplished by the adapter 80 in a relatively lightweight implementation. The form engine 78 may, however, desire or require a UI binding to be selectable at run-time. Accordingly, the adapter 80 may provide that a normal or full UI binding is selected when a form is to be started. However, the adapter 80 may provide that a minimal or empty UI binding is selected when a script is to be run. Accordingly, although an embodiment of the present invention may functionally include the form engine 78 and the script engine 82, the script engine 82 may actually be an adaptation of the form engine 78 instead of a separate device or module.

Thus, according to an exemplary embodiment, the adapter 80 may be configured to determine whether a script is to be run or a form is to be started. Based on the determination, the adapter 80 may be configured to provide for selection of a full or normal UI binding if the form is to be started, but provide for selection of a reduced (e.g., minimal or empty) UI binding if the script is to be run. As such, for example, the adapter 80 may essentially replace the UI layer portion of an XForms engine with a relatively small "nothing", empty or null UI layer. The adapter 80 may thereby be capable of utilizing the same model portion (corresponding to the model portion of a form markup language) in both a form engine and a script engine by enabling use of the model portion and the UI portion of the form engine 78 when operating on forms and eliminating the UI portion to effectively disable the UI portion of the form engine 78 (to effectively adapt the form engine 78 into the script engine 82) so that only the model portion of the form markup language is effectively usable when operating on scripts. As such, for example, the script engine 82 may essentially be embodied by XForms having a special reduced (e.g., null, empty, minimal or nothing) UI portion.

In an exemplary embodiment, access to the phone and service platform can be done in various different ways. As an example, the form markup language (e.g., XForms) may be extended to include new actions (e.g., an action for sending an email message). As an alternative, a local representational state transfer (REST) service may be defined. The script may access the local REST service with standard XForms submissions. For example, to send an email, a service may be defined at a URL "service:/email", which may take as an argument (submission) an XML document that specifies the receiver, subject and contents of the email message using an XML schema (syntax) specific to an email sending service. To send an email, the script may simply provide a POST request to the service. Similarly, information such as a specific document can be fetched by the script by doing a GET request to a service that returns the desired information as an XML document. Request parameters such as the document identifier of a desired document may be passed either as URL parameters or as an XML body included in the GET request.

An example of a simple script that sends an automatic out-of-office reply is provided below.

```
<XForms:model>
    <XForms:instance id="document"/> <!-- document "slot" for the argument document
-->
    <XForms:instance id="EmailData"> <!-- Parameters for the email sending service -->
        <Message>
            <Receiver/>      <!-- Filled in by script -->
            <Subject/>    <!-- Filled in by script -->
            <Content>Hi, I am out of office at the moment. I will get back to you as soon as
possible.</Content>
        </Message>
    </XForms:instance>
    <XForms:submission id="SendEmail" ref="instance('EmailData')"
action="service:/email" method="POST" />
        <XForms:action ev:event="XForms-ready"> <!-- Processing starts here -->
            <!-- Fill in the Receiver parameter -->
        <XForms: setvalue ref="instance('EmailData')/Receiver"
value="instance('document')/Sender" >
            <!-- Fill in the Subject parameter -->
        <XForms:setvalue ref="instance('EmailData')/Subject" value="concat('Out of
Office Autoreply:', instance('document')/Subject)" />
            <XForms:send submission="SendEmail"/> <!-- Submit request to the email service
-->
    </XForms: action>
</XForms:model>
```

Note that the script assumes that the received document looks like this:

```
<Document>
    <Sender>john.doe@example.com</Sender>
    <Receiver>your.address@nokia.com</Receiver>
    <Subject>Request for Information</Subject>
    <!-- ...Service-specific information... -->
</Document>
```

Because an XForms script engine may be implemented as an XForms form engine with special reduced or "empty" user interface bindings that may take negligible space, the script engine 82 may be implemented with negligible additional space (e.g., on the order of 1-5 kilobytes) when an XForms form engine is already present as the form engine 78. Thus, for example, extensions, improvements, etc., may be accomplished in the form engine that are not purely UI related, but are usable in the script engine with no additional effort. Accordingly, form authors may not need to learn a separate language in order to be able to create scripts. As such, for example, REST interfaces supported by XForms may allow a flexible, yet standard XForms compliant interface to phone and service platform functionality.

Figure 3:
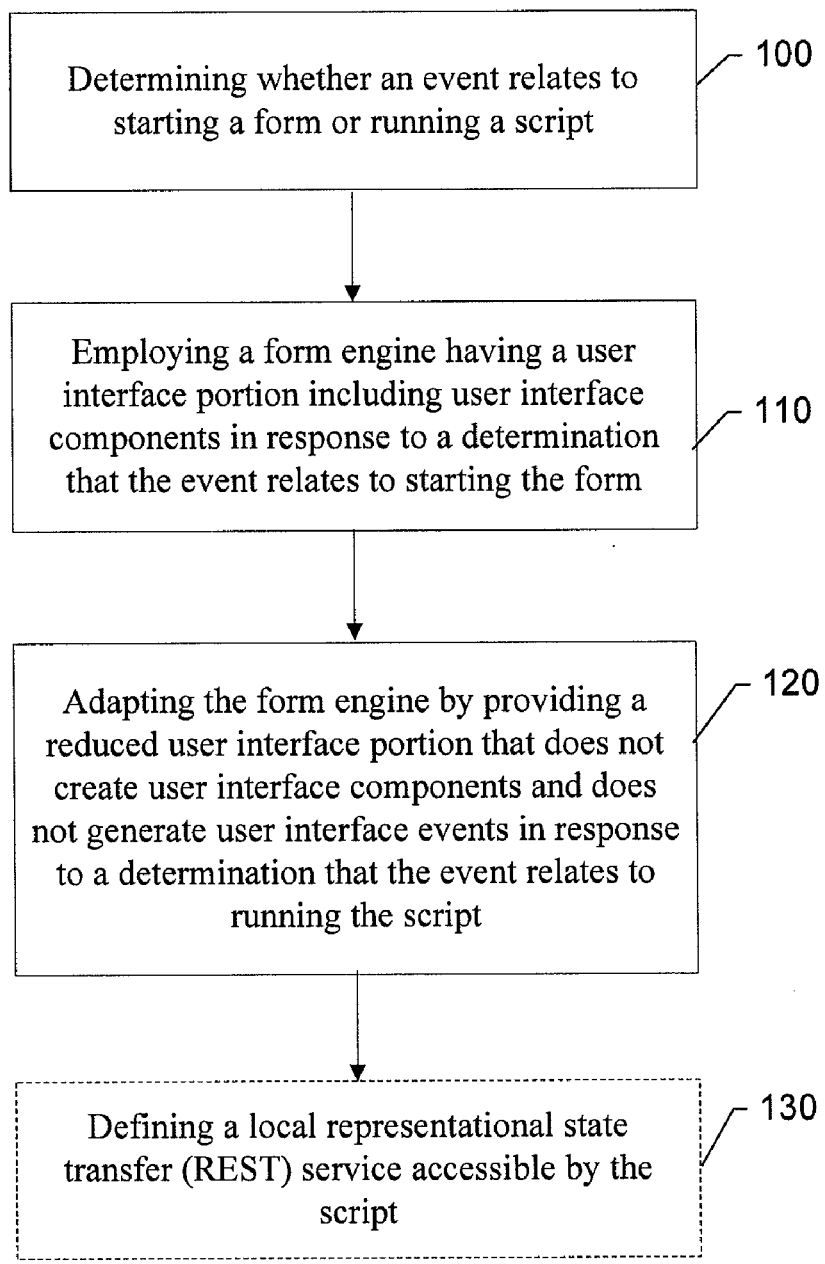
FIG. 3 is a flowchart of a method for employing a form engine as a script engine according to an exemplary embodiment of the present invention.

FIG. 3 is a flowchart of a system, method and program product according to some exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, service platform or other apparatus employing embodiments of the present invention and executed by a processor in the mobile terminal, service platform or other apparatus. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowchart block(s) or step(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowchart block (s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for enabling adaptation of a form engine for utilization in script processing as a script engine as illustrated, for example, in FIG. 3 may include determining whether an event relates to starting a form or running a script at operation 100 and employing a form engine having a user interface portion including user interface components in response to a determination that the event relates to starting the form at operation 110. The method may further include adapting the form engine by providing a reduced user interface portion that does not create user interface components and does not generate user interface events in response to a determination that the event relates to running the script at operation 120.

In some embodiments, the method may include further optional operations, an example of which is shown in dashed lines in FIG. 3. Optional operations may be performed in any order and/or in combination with each other in various alternative embodiments. As such, the method may further include an operation of defining a local representational state transfer (REST) service accessible by the script at operation 130.

In some embodiments, certain ones of the operations above may be modified or further amplified as described below. It should be appreciated that each of the modifications or amplifications below may be included with the operations above either alone or in combination with any others among the features described herein. In this regard, for example, employing the form markup language may include employing XForms. In some cases, adapting the form markup language may include removing the user interface portion of the form markup language. Additionally or alternatively, adapting the form markup language may include enabling use of a model portion of the form engine (and a null or empty user interface binding) to run the script via execution of an event handler without involving user interaction. In an exemplary embodiment, defining the local REST service may include defining a service accessible by the script via standard XForms submissions.

In an exemplary embodiment, an apparatus for performing the method of FIG. 3 above may comprise a processor (e.g., the processor 70) configured to perform some or each of the operations (100-130) described above. The processor may, for example, be configured to perform the operations (100-130) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-130 may comprise, for example, the processor 70, the adapter 80, or an algorithm executed by the processor for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining whether an event relates to starting a form or running a script;
   employing a form engine having a model portion and a user interface portion including user interface components in response to a determination that the event relates to starting the form; and
   adapting the form engine having the model portion for use as a script engine by providing a reduced user interface portion that does not create user interface components and does not generate user interface events in response to a determination that the event relates to running the script, wherein adapting the form engine having the model portion for use as the script engine comprises replacing the user interface portion of the form engine with a null user interface binding such that the user interface portion of a form markup language is eliminated resulting in the form markup language being a scripting language.

2. The method of claim 1, wherein employing the form engine comprises employing an XForms form engine.

3. The method of claim 1, wherein adapting the form engine having the model portion for use as the script engine comprises replacing the user interface portion of the form engine with an empty user interface binding.

4. The method of claim 1, further comprising defining a local representational state transfer (REST) service accessible by the script.

5. The method of claim 4, wherein defining the local REST service comprises defining a service accessible by the script via standard XForms submissions.

6. The method of claim 1, wherein adapting the form engine having the model portion for use as the script engine comprises enabling use of the model portion of the form engine to run the script via execution of an event handler without involving user interaction by removing the user interface portion of the form engine.

7. A computer program product comprising:
   at least one non-transitory computer-readable storage medium having computer-executable program code instructions stored therein, the computer-executable program code instructions comprising:
   program code instructions for determining whether an event relates to starting a form or running a script;
   program code instructions for employing a form engine having a model portion and a user interface portion including user interface components in response to a determination that the event relates to starting the form; and
   program code instructions for adapting the form engine having the model portion for use as a script engine by providing a reduced user interface portion that does not create user interface components and does not generate user interface events in response to a determination that the event relates to running the script, wherein program code instructions for adapting the form engine having the model portion for use as the script engine include instructions for replacing the user interface portion of the form engine with a null user interface binding such that the user interface portion of a form markup language is eliminated resulting in the form markup language being a scripting language.

8. The computer program product of claim 7, wherein program code instructions for employing the form engine include instructions for employing a XForms form engine.

9. The computer program product of claim 7, wherein program code instructions for adapting the form engine having the model portion for use as the script engine include instructions for replacing the user interface portion of the form engine with an empty user interface binding.

10. The computer program product of claim 7, further comprising program code instructions for defining a local representational state transfer (REST) service accessible by the script.

11. The computer program product of claim 10, wherein program code instructions for defining the local REST service include instructions for defining a service accessible by the script via standard XForms submissions.

12. The computer program product of claim 7, wherein program code instructions for adapting the form engine having the model portion for use as the script engine include instructions for enabling use of the model portion of the form engine to run the script via execution of an event handler without involving user interaction by removing the user interface portion of the form engine.

13. An apparatus comprising:
a processor; and
a memory including computer program code, the memory and the computer program code configured to, with the processor, cause the apparatus to at least:
determine whether an event relates to starting a form or running a script;
employ a form engine having a model portion and a user interface portion including user interface components in response to a determination that the event relates to starting the form; and
adapt the form engine having the model portion for use as the script engine by providing a reduced user interface portion that does not create user interface components and does not generate user interface events in response to a determination that the event relates to running the script, wherein the memory including the computer program code is further configured to with the processor, cause the apparatus to adapt the form engine having the model portion for use as the script engine by replacing the user interface portion of the form engine with a null user interface binding such that the user interface portion of a form markup language is eliminated resulting in the form makeup language being a scripting language.

14. The apparatus of claim 13, wherein the memory including the computer program code is further configured to, with the processor, cause the apparatus to employ the form engine by employing a XForms form engine.

15. The apparatus of claim 13, wherein the memory including the computer program code is further configured to, with the processor, cause the apparatus to adapt the form engine having the model portion for use as the script engine by replacing the user interface portion of the form engine with an empty user interface binding.

16. The apparatus of claim 13, wherein the memory including the computer program code is further configured to, with the processor, cause the apparatus to define a local representational state transfer (REST) service accessible by the script.

17. The apparatus of claim 16, wherein the memory including the computer program code is further configured to, with the processor, cause the apparatus to define the local REST service by defining a service accessible by the script via standard XForms submissions.

18. The apparatus of claim 13, wherein the memory including the computer program code is further configured to, with the processor, cause the apparatus to adapt the form engine having the model portion for use as the script engine by enabling use of a model portion of the form engine to run the script via execution of an event handler without involving user interaction by removing the user interface portion of the form engine.

19. The apparatus of claim 13, further comprising a memory device for storing instructions executable by the processor.

20. An apparatus comprising:
a processor, wherein the processor comprises:
means for determining whether an event relates to starting a form or running a script;
means for employing a form engine having a model portion and a user interface portion including user interface components in response to a determination that the event relates to starting the form; and
means for adapting the form engine having the model portion for use as a script engine by providing a reduced user interface portion that does not create user interface components and does not generate user interface events in response to a determination that the event relates to running the script, wherein means for adapting the form engine having the model portion for use as the script engine comprises means for replacing the user interface portion of the form engine with a null user interface binding such that the user interface portion of a form markup language is eliminated resulting the form markup language being a scripting language.

21. The apparatus of claim 20, wherein means for employing the form engine comprises means for employing a XForms form engine.

* * * * *

UNITED STATES PATENT AND TRADEMARK OFFICE
CERTIFICATE OF CORRECTION

PATENT NO. : 8,381,172 B2
APPLICATION NO. : 12/326556
DATED : February 19, 2013
INVENTOR(S) : Koskimies It is certified that error appears in the above-identified patent and that said Letters Patent is hereby corrected as shown below:

In the Claims

Column 13,
Line 40, "makeup language" should read --markup language--.

Column 14,
Line 42, "resulting the" should read --resulting in the--.

Signed and Sealed this
Twenty-seventh Day of August, 2013

Teresa Stanek Rea
*Acting Director of the United States Patent and Trademark Office*